Patented Nov. 30, 1943

2,335,384

UNITED STATES PATENT OFFICE 2,335,384

PEST CONTROL

Euclid W. Bousquet, James E. Kirby, and Norman E. Searle, Wilmington, Del., assignors to E. I. du Pont de Nemours & Company, Wilmington, Del., a corporation of Delaware No Drawing. Application April 24, 1940,
Serial No. 331,390

22 Claims. (Cl. 167—22)

This invention relates to pest control and is particularly directed to compositions suitable for controlling various economically harmful organisms which commonly infest and attack plant and animal matter either in its natural or fabricated state, and has for its particular and distinctive feature of novelty such compositions as contain one or more of the nitroethylenes as an active pest control ingredient.

The nitroethylenes which constitute the active agents of the pest control compositions of this invention are compounds which in general may be obtained by the condensation of a ketaldone and a nitro compound containing a nitro methyl group $NO_2CH_2$—. The term "ketaldone" refers generically to aldehydes and ketones. The reaction by type may be represented by $$R_1R_2C=O+NO_2CH_2R_3 \rightarrow R_1R_2C=C(R_3)NO_2+H_2O$$

A nitroethylene then has the type formula $$R_1R_2C=C(R_3)NO_2$$

in which $R_1$ and $R_2$ are radicals of a ketaldone and $R_3$ is hydrogen or an aliphatic or aromatic radical.

The condensation of a ketaldone and a nitro compound containing the nitromethyl group is a reaction well known in the art which may be effected, for example, as described in Organic Syntheses, collective volume 1, page 405; by Rao and Co-workers in Helv. Chim. Acta 12, 581 (1929); by Knoevenagel and Walter in Ber. 37, 4502 (1904); by Kobayashi in Sci. Papers Inst. Phys. Chem. Research (Tokio) 6, 149–65 (1927); by Meisenheimer and Co-workers in Ann. 468, 202–58 (1929), and various adaptations of these processes to particular nitroethylenes. The nitroethylenes may also be prepared by other methods. For example, o-, m-, or p-nitrocinnamic acid on treatment with strong nitric acid loses carbon dioxide and yields the corresponding 1-nitro-2-(nitrophenyl)ethylene; direct nitration of styrene gives beta-nitrostyrene; and dehydro-acetylation of 1-acetoxy-2-nitropropane yields 2-nitropropene. Thus nitroethylenes may be prepared in widely differing manners, and however prepared are compounds of the type formula $R_1R_2C=C(R_3)NO_2$.

Now it has been found that the class of compounds described as nitroethylenes are toxic to a surprisingly wide variety of organisms, such as bacteria, fungi and insects, and other economically and physiologically harmful lower forms of life. Compounds containing the nitroethylene group

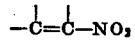

are effective in controlling one or more types of pests, though toxicity and specificity vary considerably according to the nature of the substituent groups. Nonetheless, all available data indicate that the nitroethylene group

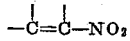

is inimical to living plant and animal organisms in many forms.

Evaluation of a wide variety of nitorethylenes synthesized from the most easily and economically available raw materials in which the radicals $R_1R_2$ and $R_3$ of the type formula are widely different indicates clearly that toxicity attaches to the nitroethylene group

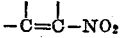

and that substituent groups merely increase or, possibly, particularly in connection with certain pests, decrease the toxic effect of the compound. Significant but not exhaustive data to this effect follow:

The high efficiency of the nitroethylenes in controlling the growth of different types of fungi is shown by the data of the following table. The results are those obtained by making a dispersion of the fungicide in sterile liquid malt agar (pH of 5.7) followed, after hardening, by inoculation with a suspension of the appropriate fungus organisms.

TABLE I

| Compound | Concentration effective against— | |
|---|---|---|
| | Mixed Penicillium lumber molds | Aspergillus niger |
| 2-nitro-1-phenylpropene | 1:32,000 | 1:32,000 |
| 4-chloro-beta-nitrostyrene | 1:32,000 | 1:16,000 |
| 2-nitro-1-phenylbutene | 1:16,000 | 1:16,000 |
| 2-nitro-1-phenylpentene | 1:16,000 | 1:16,000 |
| 2-carboxy-beta-nitrostyrene | 1:1,000 | 1:1,000 |
| 1-(alpha-furyl)-2-nitro-ethylene | 1:60,000 | 1:60,000 |
| 2-methoxy-beta-nitrostyrene | 1:32,000 | 1:32,000 |
| 4-isopropyl-beta-nitrostyrene | 1:32,000 | 1:16,000 |
| Salicylidenenitromethane | 1:4,000 | 1:4,000 |
| 2-chloro-6-beta-dinitrostyrene | 1:4,000 | 1:4,000 |
| 2-chloro-beta-nitrostyrene | 1:32,000 | 1:16,000 |
| 1-nitro-2-m-tolylethylene | 1:32,000 | 1:32,000 |
| 3,4-dimethoxy-beta-nitrostyrene | 1:8,000 | 1:4,000 |
| 2-nitropropene | 1:2,000 | 1:2,000 |
| 3,4-methylenedioxy-beta-nitrostyrene | 1:4,000 | 1:4,000 |
| 4-methoxy-beta-nitrostyrene | 1:16,000 | 1:16,000 |
| 3-beta-dinitrostyrene | 1:4,000 | 1:8,000 |
| 4-phenyl-1-nitro-1,3-butadiene | 1:16,000 | 1:16,000 |
| 1-(p-chlorophenyl)2-nitropropene | 1:4,000 | 1:4,000 |
| 3-ethyoxy-4-hydroxy-beta-nitrostyrene | 1:250 | 1:250 |
| 2,4-dimethoxy-beta-nitrostyrene | 1:2,000 | 1:250 |
| 4-hydroxy-3-methoxy-beta-nitrostyrene | 1:4,000 | 1:2,000 |
| 1-nitro-3-phenylpropene | 1:1,000 | 1:1,000 |
| Beta-nitrostyrene | 1:60,000 | 1:60,000 |

From these data it is evident that many of the nitroethylenes are outstandingly toxic to the particular micro-organisms of the test. Beta-nitrostyrene and 1-(alpha-furyl-2-nitroethylene were effective at the exceptionally high dilution of 1:60,000. The precise limit was not determined since the next highest dilution was 1:120,000 so that it might be more proper to say that these compounds were effective somewhere between 1 and 2 parts per 120,000 parts. Under the same conditions alpha-nitronapthalene is effective against the mixed lumber molds at 1:2000 to 1:4000. Para-nitrophenol similarly is effective at 1:4000 to 1:8000.

The agents of this invention are also effective as bactericides, though only moderately so. Table II is illustrative and shows concentration required to inhibit growth of the organism.

TABLE II

| Compound | Concentration effective against— | |
|---|---|---|
| | S. aureus | B. mesentericus |
| 3,4-methylenedioxy-beta-nitrostyrene | 1:500 | 1:1,000 |
| 4-methoxy-beta-nitrostyrene | 1:4,000 | 1:16,000 |
| 3-beta-dinitrostyrene | 1:1,000 | 1:4,000 |
| 1-nitro-4-phenyl-1,3-butadiene | 1:1,000 | 1:4,000 |

These compounds were tested in 2.3% Bacto Nutrient Agar which had a pH of about 6.8.

The nitroethylenes are also effective in the control of insect pests. The data of Table III demonstrates the relative activity of eighteen nitroethylenes in killing clothes moth larvae and for protecting textiles from their depredations.

TABLE III

| Compound | Tineola biselliella larvae killed | Area of fabric damaged |
|---|---|---|
| | Per cent | Per cent |
| 4-(dimethylamino)-beta-nitrostyrene | 19 | 38 |
| 2-chloro-6-beta-dinitrostyrene | 63 | 10 |
| 2-chloro-beta-nitrostyrene | 100 | 0 |
| 1-nitro-2-m-tolylethylene | 100 | 0 |
| 3,4-dimethoxy-beta-nitrostyrene | 68 | 5 |
| 1-(p-chlorophenyl)-2-nitropropene | 100 | 8 |
| Sodium beta-nitrostyrene-o-sulfonate | 93 | 3 |
| 3-beta-dinitrostyrene | 80 | 9 |
| 4-isopropyl-beta-nitrostyrene | 100 | 1 |
| 2-methoxy-beta-nitrostyrene | 95 | 4 |
| 3-ethoxy-4-hydroxy-beta-nitrostyrene | 85 | 30 |
| 2,4-dimethoxy-beta-nitrostyrene | 40 | 25 |
| 4-hydroxy-3-methoxy-beta-nitrostyrene | 80 | 18 |
| 1-nitro-3-phenylpropene | 20 | 50 |
| 3,4-methylenedioxy-beta-nitrostyrene | 55 | 15 |
| 4-methoxy-beta-nitrostyrene | 95 | 25 |
| Salicylidenenitromethane | 100 | 35 |
| Beta-nitrostyrene | 40 | 15 |

The above results are those obtained under rigorous test conditions. For each test 10 vigorous moth larvae are confined with approximately two square inches of fluffy woolen test fabric which had been impregnated with about 2% solution of the test compound and dried. The data are recorded after a two-weeks interval. The damage is evaluated by estimating the per cent of surface the nap of which has been fed upon.

The nitroethylenes may be used to prevent decay and putrefaction of materials such as rawhides, glues, gelatins, carbohydrate pastes, glyptal resins, ropes, lumber, fabrics, leather and other natural or fabricated animal or plant matter subject to attack and decomposition by micro-organisms. They may also be used to control fungous diseases in living plant matter, especially for disinfecting seeds and dormant plants. They may also be used for the control of depredatory insects and like animal organisms preying on similar materials. They may have some value for but are not especially recommended as plant sprays in view of their tendency to burn and destroy foliage. They may be used as weed killers, especially in combination with acid materials such as arsenic acid, sulfuric acid, sulfamic acid and the like. They are especially adapted for incorporation in fabricated products, such as cotton and woolen textiles, fiber board, leather goods and the various materials mentioned, above, for preventing attack of micro-organisms and insects and other like plant and animal organisms.

The highly volatile nitroethylenes may be used in fumigation, and most of them are sufficiently volatile to have some fumigating action. The following table shows the fumigant activity of 2-nitropropene in connection with the clothes moth larvae, the carpet beetle larvae and the confused flour beetle, adult and larvae.

TABLE IV

Effect of 2-nitropropene vapor on insects

| Insect | Compound | Kill at concentration expressed as cc. of liquid per cu. ft. | | |
|---|---|---|---|---|
| | | 3.0 cc. | 1.5 cc. | 0.75 cc. |
| | | Per cent | Per cent | Per cent |
| Tineola biselliella larvae. | 2-nitropropene | 100 | 100 | 100 |
| | Carbon tetrachloride | 100 | 100 | 0 |
| Attagenus piceus larvae. | 2-nitropropene | 70 | 70 | 20 |
| | Carbon tetrachloride | 70 | 56 | 0 |
| Confused flour beetle adults. | 2-nitropropene | 100 | 100 | 100 |
| | Carbon tetrachloride | 100 | 100 | 0 |
| Confused flour beetle larvae. | 2-nitropropene | 100 | 100 | 100 |
| | Carbon tetrachloride | 83 | 100 | 0 |

The nitroethylenes containing less than six carbon atoms are most suitable as fumigants.

Application of nitroethylenes for the various purposes disclosed may be made from solutions in suitable solvents, such as alcohol, benzene, and petroleum naphtha, or from dispersions in aqueous or other media, or in the form of a dust. They may be used in combination with supplementary agents, such as talc, bentonite, tricalcium phosphate, various clays, spreading agents, stickers and other adjuvants commonly used in pest control compositions. They may also be used in combination with other pest control agents, such as copper and sulfur fungicides or organic fungicides, lead arsenate, phenothiazine, barium fluosilicate, xanthone, pyrethrum, rotenone, thiocyanates, methyl bromide and various other agents commonly used in fungicidal and insecticidal applications. The products of this invention should not be used with alkali or alkaline agents, and preferably are compounded in and used in media having a pH of less than 7.0. Caution should be used in using these products since many of them are lachrymatory and irritant to the skin.

While we have illustrated our invention with reference to certain specific nitroethylenes, it is to be understood that in its broader aspects we do not desire to be limited to any particular nitroethylene. Thus, our invention includes compounds of the type $R_1R_2C=C(R_3)NO_2$ in which $R_1$ and $R_2$ are the radicals of a ketaldone and $R_3$ is either hydrogen, alkyl, aralkyl or aryl. The alkyl, aralkyl and aryl groups may be substituted or unsubstituted and without qualification are meant to include both.

Certain of the nitroethylenes of this invention may be classed as completely aliphatic, in which case the radicals $R_1$ and $R_2$ are the radicals of a completely aliphatic ketaldone and $R_3$ is hydrogen or alkyl. The alkyl group may be cyclic or acyclic and is intended to include both unless otherwise qualified. Compounds of this class include 1-nitropropene, 2-nitropropene, 3-methyl-1-nitrobutene, 2-nitro-2-nonene, cyclohexylidenenitromethane, 2-methyl-3-nitro-2-pentene, 3,5-dimethyl-2-nitro-2,4-hexadiene, and like compounds which are readily available from aliphatic ketaldones such as formaldehyde, acetaldehyde, isobutyraldehyde, heptaldehyde, cyclohexanone, acetone, mesityl oxide, and isobutyl methyl ketone and various nitro paraffins such as nitromethane, nitroethane, alpha-nitropropane, alpha-nitrobutane, etc.

Another group which is aliphatic in nature are those which may be derived from the condensation of a nitro-paraffin with an aralkyl ketaldone. Compounds such as 4-phenyl-2-nitro-2-butene, 4-nitro-6-phenyl-4-hexene, and 2-methyl-4-phenyl-1-nitrobutene, which are readily available from ketaldones such as beta-phenylacetaldehyde, cinnamic aldehyde, and beta-phenylethyl methyl ketone and various aliphatic alpha-nitro compounds are typical.

Another distinct group includes compounds in which at least one of the radicals $R_1$, $R_2$ and $R_3$ is aromatic. These may be obtained by the condensation of a suitable aromatic ketaldone such as acetophenone, benzophenone, piperonal, furfural, vanillin, anisaldehyde, benzaldehyde, salicylaldehyde and the like, with a suitable nitro compound, or by condensing any suitable ketaldone with omega-nitrotoluene and similar nitromethylbenzenes. Beta-nitrostyrene and 1-(alpha-furyl)-2-nitroethylene are typical of those in which $R_1$ and $R_2$ are radicals of an aromatic aldehyde and 1-nitro-2,2-diphenylethylene and 2-nitro-1,1-diphenylbutene and 1-nitro-2-phenylpropene typify those obtained from aromatic ketones. The alpha-nitroarylethylenes are typified by para-chloro-alpha-nitrostyrene, m-nitro-alpha-nitrostyrene, 1-nitro-1-phenylpropene, 1-nitro-1-phenyloctene, 1-nitro-1-phenyl-2-methylbutene, alpha-nitrostilbene, p,p'-dinitro-alpha-nitrostilbene, 1-nitro-1,2-diphenylpropene, and 2-(alpha-furyl)-1-nitro-1-phenylethylene. In addition all three radicals may be aromatic, as for example, triphenyl-nitroethylene, tri(p-chlorophenyl)nitroethylene, and 1-naphthyl-1-nitro-2,2-diphenylethylene.

We claim:

1. A pest control composition containing as an essential active ingredient a compound containing the nitroethylene structure

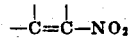

2. In the art of pest control the method of immunizing organic matter from attack by economically harmful organisms which comprises treating said materials with a compound containing the nitroethylene structure

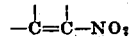

3. A pest control composition containing as an essential active ingredient a compound of the type $R_1R_2C=C(R_3)NO_2$ in which $R_1$ and $R_2$ are the radicals of a ketaldone and $R_3$ is selected from the group consisting of hydrogen, alkyl, aralkyl and aryl radicals, and a carrier therefor.

4. A pest control composition containing as an essential active ingredient an aryl nitroethylene, and a carrier therefor.

5. A pest control composition containing as an essential active ingredient a compound of the type $R_1R_2C=C(R_3)NO_2$ in which $R_1$ and $R_2$ are the radicals of an aromatic ketaldone and $R_3$ is selected from the group consisting of hydrogen, alkyl, aralkyl and aryl, and a carrier therefor.

6. In the art of pest control the method of immunizing organic matter from attack by economically harmful organisms which comprises treating said material with a compound of the type $R_1R_2C=C(R_3)NO_2$ in which $R_1$ and $R_2$ are the radicals of an aromatic aldehyde and $R_3$ is selected from the group consisting of hydrogen and alkyl groups.

7. A pest control composition containing as an essential active ingredient a beta-nitro-arylethylene, and a carrier therefor.

8. A pest control composition containing as an essential active ingredient a compound of the type $R_1R_2C=C(R_3)NO_2$ in which $R_1$ and $R_2$ are the radicals of an aliphatic ketaldone and $R_3$ is selected from the class consisting of hydrogen and alkyl radicals, and a carrier therefor.

9. A fungicidal composition containing as an essential active ingredient a compound of the type $R_1R_2C=C(R_3)NO_2$ in which $R_1$ and $R_2$ are the radicals of a ketaldone and $R_3$ is selected from the group consisting of hydrogen, alkyl, aralkyl and aryl radicals and a carrier therefor.

10. A fungicidal composition containing as an essential active ingredient a compond of the type $R_1R_2C=C(R_3)NO_2$ in which $R_1$ and $R_2$ are the radicals of an aromatic ketaldone and $R_3$ is selected from the group consisting of hydrogen, alkyl, aralyl and aryl and a carrier therefor.

11. A fungicidal composition containing as an essential active ingredient a compound of the type $R_1R_2C=C(R_3)NO_2$ in which $R_1$ and $R_2$ are the radicals of an aliphatic ketaldone and $R_3$ is selected from the class consisting of hydrogen and alkyl radicals, and a carrier therefor.

12. A fungicidal composition containing as an essential active ingredient an aryl nitroethylene, and a carrier therefor.

13. A fungicidal composition containing as an essential active ingredient a beta-nitroarylethylene, and a carrier therefor.

14. In the art of pest control the method of immunizing organic matter from attack by economically harmful microorganisms which comprises treating said material with a compound of the type $R_1R_2C=C(R_3)NO_2$ in which $R_1$ and $R_2$ are the radicals of an aromatic aldehyde and $R_3$ is selected from the group consisting of hydrogen and alkyl groups.

15. In the art of pest control the method of destroying pestiferous organisms in infested organic material which comprises exposing the infested material in a closed space to the vapors of an alkyl nitroethylene containing less than six carbon atoms.

16. A pest control composition containing as an essential active ingredient 1-(alpha-furyl)-2-nitroethylene, and a carrier therefor.

17. A pest control composition containing as an essential active ingredient 2-nitropropene, and a carrier therefor.

18. A fungicidal composition containing as an essential active ingredient beta-nitrostyrene, and a carrier therefor.

19. A fungicidal composition containing as an essential active ingredient 1-(alpha-furyl)-2-nitroethylene, and a carrier therefor.

20. A pest control composition containing as an essential active ingredient a compound of the type $R_1R_2C=C(R_3)NO_2$ in which $R_1$ and $R_2$ are the radicals of a ketaldone and $R_3$ is a radical selected from the group consisting of hydrogen and aliphatic and aromatic radicals, and a carrier therefor.

21. In the art of pest control the method of destroying pestiferous organisms in infested material which comprises incorporating in the infested material a compound containing the nitroethylene structure

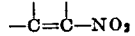

22. In the art of pest control the method of destroying pestiferous organisms in infested material which comprises incorporating in the infested material an aryl nitroethylene.

EUCLID W. BOUSQUET.
JAMES E. KIRBY.
NORMAN E. SEARLE.

CERTIFICATE OF CORRECTION.

Patent No. 2,335,384.    November 30, 1943.

EUCLID W. BOUSQUET, ET AL.

It is hereby certified that error appears in the printed specification of the above numbered patent requiring correction as follows: Page 1, second column, line 60, for "1-(alpha-furfyl-2-nitroethylene" read --1-(alpha-furyl)-2-nitroethylene--; page 3, first column, line 58, below the formula, insert --and a carrier therefor--; and second column, line 34, for "compond" read --compound--; line 38, for "aralyl" read --aralkyl--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.

CERTIFICATE OF CORRECTION.

Patent No. 2,335,384.　　　　　　　　　　　　　　November 30, 1943.

EUCLID W. BOUSQUET, ET AL.

It is hereby certified that error appears in the printed specification of the above numbered patent requiring correction as follows: Page 1, second column, line 60, for "1-(alpha-furfyl-2-nitroethylene" read --1-(alpha-furyl)-2-nitroethylene--; page 3, first column, line 58, below the formula, insert --and a carrier therefor--; and second column, line 34, for "compond" read --compound--; line 38, for "aralyl" read --aralkyl--; and that the said Letters Patent should be read with this correction therein that the same may conform to the record of the case in the Patent Office.

Signed and sealed this 1st day of February, A. D. 1944.

(Seal)　　　　　　　　　　　　　　　　　Henry Van Arsdale,
　　　　　　　　　　　　　　　　　　Acting Commissioner of Patents.